US005323602A

United States Patent [19]

Defever

[11] Patent Number: 5,323,602

[45] Date of Patent: Jun. 28, 1994

[54] FUEL/AIR DISTRIBUTION AND EFFUSION COOLING SYSTEM FOR A TURBINE ENGINE COMBUSTOR BURNER

[75] Inventor: Guido J. Defever, Commerce Township, Oakland County, Mich.

[73] Assignee: Williams International Corporation, Walled Lake, Mich.

[21] Appl. No.: 58,469

[22] Filed: May 6, 1993

[51] Int. Cl.[5] .................... F02C 7/12

[52] U.S. Cl. .................... 60/39.36; 60/745; 60/752; 60/755

[58] Field of Search .................... 60/39.36, 752, 754, 60/755, 756, 757, 760, 745

[56] References Cited

U.S. PATENT DOCUMENTS

| | | | |
|---|---|---|---|
| 3,381,471 | 5/1968 | Szydlowski | 60/752 |
| 3,645,095 | 2/1972 | Melconian | 60/755 |
| 4,187,674 | 2/1980 | Richardson | 60/39.36 |
| 4,870,825 | 10/1989 | Chapman | 60/745 |

FOREIGN PATENT DOCUMENTS 0486226 5/1992 European Pat. Off. .

*Primary Examiner*—Richard A. Bertsch
*Assistant Examiner*—William J. Wicker
*Attorney, Agent, or Firm*—Lyman R. Lyon

[57] ABSTRACT

An annular combustor for a gas turbine engine having a rotatable fuel slinger has a first plurality of effusion cooling holes for directing air flow radially inwardly toward said fuel slinger and circumferentially in the direction of rotation of the fuel slinger and a second plurality of effusion cooling holes on the opposite side of the fuel slinger for directing air radially inwardly and circumferentially in the direction of rotation of the fuel slinger, thereby to produce a pair of annular axially spaced helical air flow patterns having a confluence in the direction of fuel flow radially outwardly from the fuel slinger.

4 Claims, 2 Drawing Sheets

FUEL/AIR DISTRIBUTION AND EFFUSION COOLING SYSTEM FOR A TURBINE ENGINE COMBUSTOR BURNER

BACKGROUND OF THE INVENTION

Effusion cooling of the combustor walls of a turbine engine, as taught in EPC Application No. 0-486-226-AP, published May 20, 1992, has heretofore been employed to maintain a desired wall temperature in the combustor. Effusion cooling may be defined as a pattern of small, closely spaced holes serving to direct a flow of cooling air onto the walls of a gas turbine combustor. The cooling holes are generally 0.15 to 0.35 inches in diameter, and are angled relative to the combustor wall so that the hole centerline forms an angle of approximately 20 degrees with a tangent to the hot gas side of the combustor wall surface. Individual hole shape is generally cylindrical, with minor deviations due to manufacturing method i.e. edge rounding, tapers, out-of-round or oblong, etc.

Such known effusion cooling systems exhibit a two-fold cooling effect, namely (a) convectively cooling the combustor wall as the air passes through the holes, and (b) providing a continuously replenished surface cooling film. Orientation of the holes with respect to the direction of bulk gas flow in the combustor has heretofore been undisciplined. Thus, while such known effusion cooling systems result in greatly enhanced combustor wall cooling compared with typical louvered film cooled designs, the combination of effusion cooling with purging of near-injector recirculation, as well as cooling film flow geometry over the combustor liner so as to augment fuel distribution and start performance has not been addressed.

More specifically, known effusion cooling systems do not contemplate or solve problems relating to radial outflow combustor geometry. The effect of effusion cooling hole groupings, patterns and orientations on control of local combustor aerodynamics must be considered as well as cooling effectiveness.

Gas turbine combustor liners have heretofore employed various forms of louvers or thumbnail-style surface film distributors that are circumferentially distributed in spaced relation at discrete intervals. Also, it is known to provide specific aerodynamic treatment in the form of air guides adjacent fuel slingers to purge local, fuel rich, fuel/air mixture recirculation. Such methods generally attenuate the efficiency of film cooling air to control local over-temperature conditions of the combustor walls with resultant erosion and reduced durability. Moreover, known techniques of purging the near-injector area of the combustor often result in build-up of carbon or localized flame holding, interfering with fuel injection and reducing starting performance and durability.

SUMMARY OF THE INVENTION

The effusion cooled combustor of the present invention presents an improvement over known louvered or effusion cooled combustors in that effusion cooling is integrated with the fuel/air mixture flow geometry from the combustor I.D. radially outwardly to the radially outermost exit point of bulk combustion gas flow thereby to provide a highly fuel efficient durable gas turbine combustor having the attributes of lower cost, lower weight and improved ignition performance.

Specifically, the effusion cooling holes in the radially inner segments of the combustor are oriented to direct cooling film flow radially inwardly toward the fuel slinger. This feature results in the formation of smooth, uninterrupted cooling film flow across the combustor I.D. that is subsequently integrated with the radially outwardly directed fuel and secondary purge air flow toward the combustor exit. This configuration eliminates the need for heretofore required air-guides.

Orientation of the holes with respect to the axial centerline ranges up to 45 degrees, which angles result in an effective toroidal helical flow configuration of the cooling film along the combustor walls as well as improved aerodynamic interaction with the centrally disposed radially flowing fuel stream from the fuel slinger.

Yet another feature of the invention contemplates interweaving of effusion cooling holes so as to control the direction of cooling film flow while maintaining adequate cooling in the transition area. Optimal cooling of the hot combustor walls is accomplished by orienting the radially outermost cooling flows generally radially outwardly toward the combustor exit or, in other words, in the direction of bulk gas flow. To take advantage of such bulk gas flow, a transition area on both axially spaced walls of the combustor changes effusion film cooling flow orientation from radially inwardly, toward the fuel slinger, to radially outwardly toward the bulk gas flow exit. The transition area maintains sufficient cooling to protect the area from hot combustion gases. A criss-cross interweaving pattern provides such a transition on one wall while fanning of the effusion cooling holes achieves the same end result on an opposite wall. Change in the direction of cooling film flow is accomplished while maintaining adequate cooling in the transition area thereby to provide a smooth transition in cooling flow direction. This is accomplished by incrementally changing the orientation of the cooling holes, row by row, from one direction to another. The disclosed fanning pattern is especially effective in highly curved wall areas where other patterns provide less effective cooling and/or more complexity.

DETAILED DESCRIPTION OF THE PREFERRED EMBODIMENT OF THE INVENTION

Figure 1:
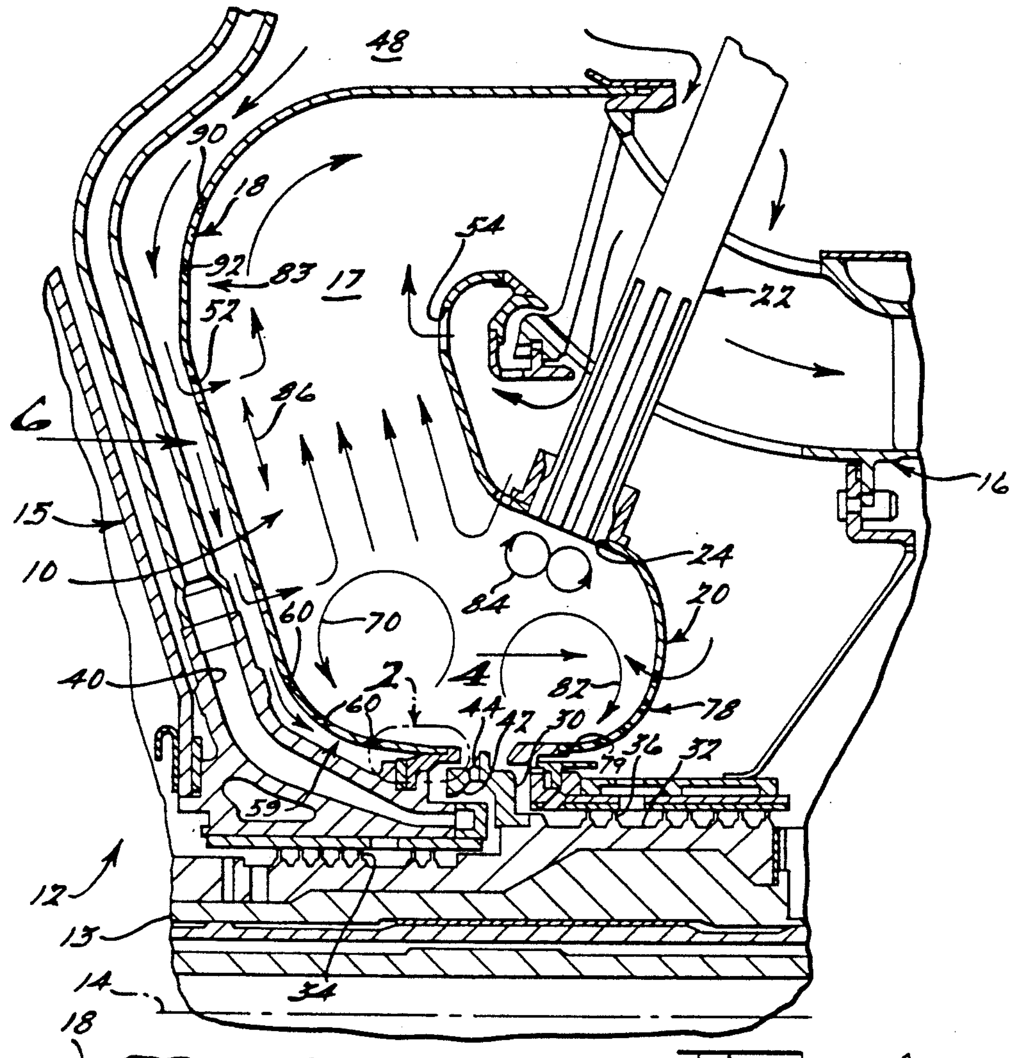
FIG. 1 is a fragmentary sectional elevation of the combustor section of a gas turbine engine.

As seen in FIG. 1, of the drawings, an effusion cooled combustor 10, in accordance with a preferred constructed embodiment of the instant invention, is shown in the environment of a gas turbine engine 12. The engine 12 is of the general configuration disclosed in U.S. Pat. No. 4,870,825, which configuration is incorporated herein by reference. The engine 12 comprises a shaft assembly 13, that extends along a central axis 14 of the engine 12 and connects a forwardly disposed compressor section 15 to a rearwardly disposed radial inflow turbine section 16. The shaft assembly 13 may be connected to appropriate power takeoff means (not shown) to remove shaft horsepower from the engine 12.

An annular combustion .chamber or combustor 17 is disposed radially outwardly of the shaft assembly 13 between the compressor and turbine sections 15 and 16, respectively. The combustion chamber 17 is defined by a forwardly disposed radially extending cover plate 18 and an axially rearwardly spaced radially extending primary plate 20.

A conventional igniter 22 extends through an aperture 24 in the primary plate 20 to effect ignition of the air/fuel mixture in the combustion chamber 17.

An annular fuel slinger 30 of cup-shaped radial cross section is mounted on a cylindrical axially extending slinger sleeve 32 which is, in turn, mounted on the shaft assembly 13. A plurality of rotatable sealing rings 34 and 36 extend radially outwardly from the slinger sleeve 32 to effect a fluid seal between the shaft assembly 13 and the nonrotatable compressor 15, combustor 17 and turbine 16 of the engine 12.

Fuel is fed to the fuel slinger 30 through a fuel line 40 that extends radially inwardly between the compressor section 15 and combustor cover plate 18 from a fuel pump (not shown). Fuel flows from the line 40 into an annular fuel trap 42 of the slinger 30. In operation, rotation of the shaft assembly 13 and fuel slinger 30 effects the discharge of fuel radially outwardly through an orifice 44 in the slinger 30, due to centrifugal force.

Primary combustion air flows from the compressor section 15 radially inwardly through a high pressure air channel 48 to primary air orifices 52 in the cover plate 18 as well as to orifices 54 in the primary plate 20.

Figure 3:
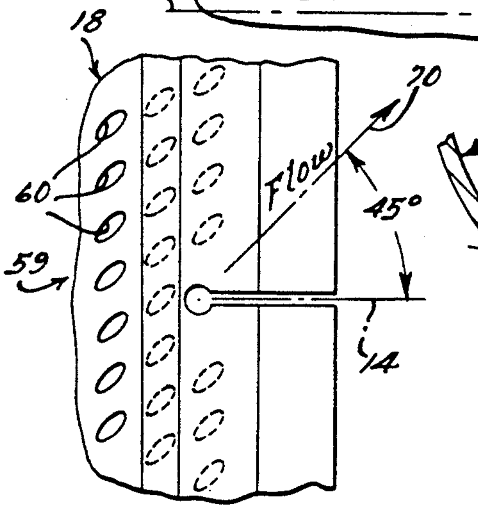
FIG. 3 is a view taken in the direction of the arrow 3 of FIG. 2.
Figure 2:
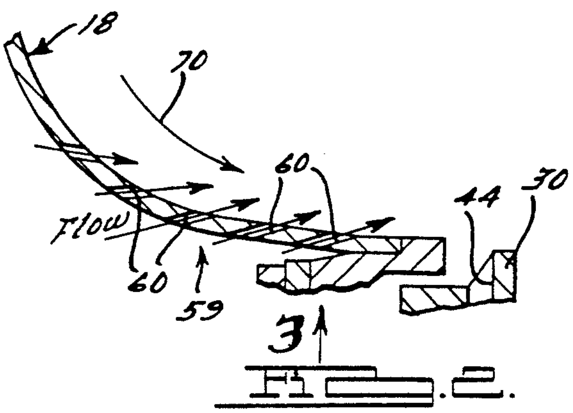
FIG. 2 is an enlarged fragmentary view taken within the circle 2 of FIG. 1.
Figure 4:
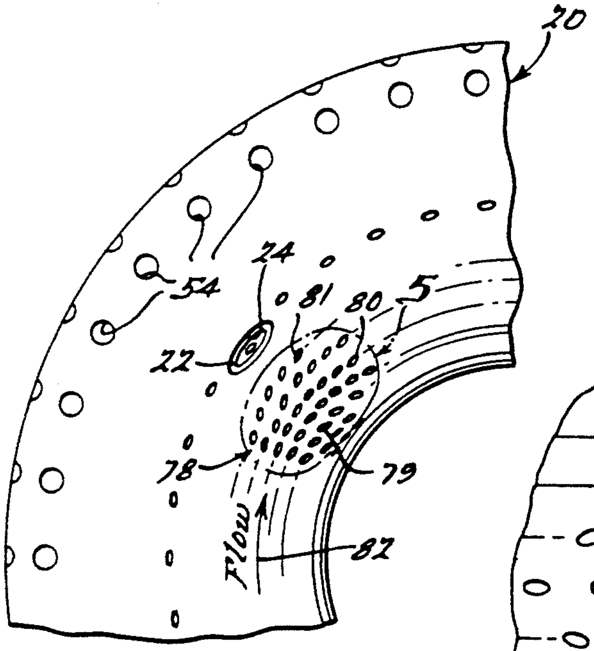
FIG. 4 is a view taken in the direction of the arrow 4 of FIG. 1.

As best seen in FIGS. 2 and 3 of the drawings, the cover plate 18 is provided with a first group of combustion augmentation and effusion cooling holes 60 immediately forwardly of the fuel slinger 30. The holes 60 extend at an angle of approximately 20° to a tangent to the surface of the cover plate 18 to direct combustion and effusion cooling air toward the fuel slinger 30. As seen in FIG. 3, the holes 60 extend circumferentially at an angle of 45° relative to the central axis 14 of the turbine engine 12 thereby to produce a flow pattern 70 that, as seen in FIG. 4, has a clockwise flow pattern, but, as seen in FIG. 1, has a helical toroidal counterclockwise flow pattern. The cover plate 18 has a second group of holes or apertures generally designated by the numeral 83. A counter flow pattern 86 is developed by holes 90 that extend radially outwardly and holes 92 that extend radially inwardly.

Figure 5:
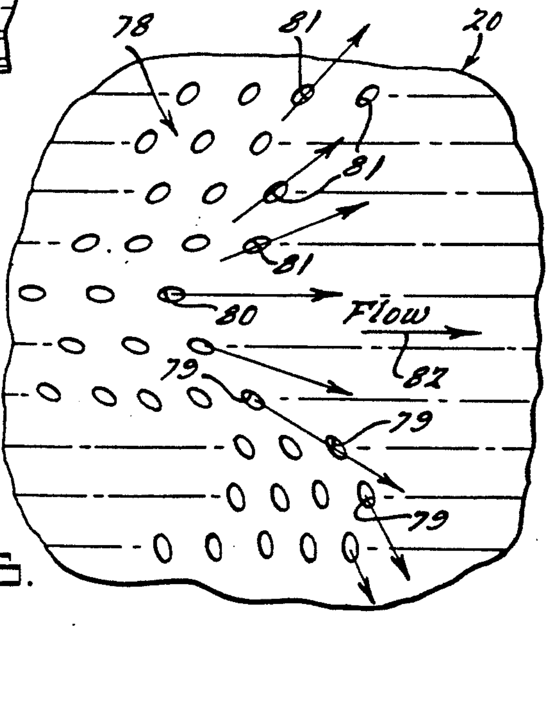
FIG. 5 is a view taken within the circle 5 of FIG. 4.

As best seen in FIGS. 4 and 5, the primary plate 20 of the combustor 10 is provided with a third group 78 of combustion augmentation and effusion cooling holes 79, 80 and 81 that are oriented in a fanning array. As best seen in FIG. 1, air flowing through the apertures 79 and 80 effects a helical toroidal flow pattern 82 of combustion air and effusion cooling of the primary plate 20.

As best seen in FIG. 1, the toroidal flow pattern 82 produced by flow through the apertures 79 and 80 in the primary plate 20 produces the combustion air flow pattern 82 that combines with the flow pattern 70 produced by the apertures 60 in the cover plate 18 to carry fuel from the slinger 30 radially outwardly into the combustion chamber 17 and towards the igniter 22. The radially outward flow of the fuel/air mixture swirls at the radially inner end of the igniter 22 producing a turbulent flow pattern 84 in the area underlying the igniter 22 thereby enhancing start and emergency restart of the engine 12.

Figure 6:
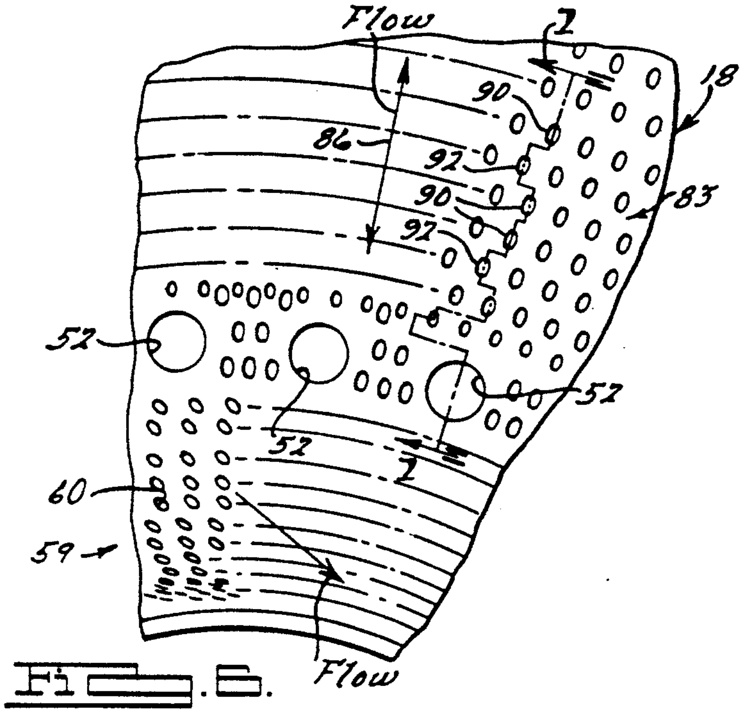
FIG. 6 is a view taken in the direction of the arrow 6 of FIG. 1.
Figure 7:
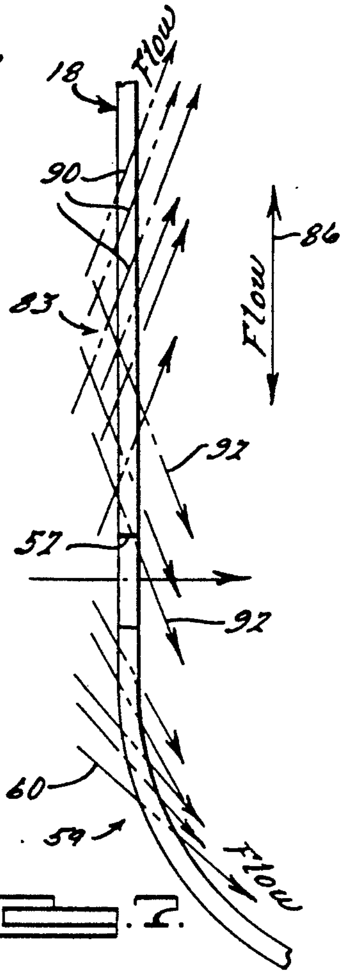
FIG. 7 is an enlarged view taken along the line 7—7 of FIG. 6.

The aforesaid oppositely helically directed toroidal flow patterns 70 and 82 are complemented by the flow pattern 86, as best seen in FIGS. 6 and 7. The flow pattern 86 is achieved by directing a first plurality of holes 90 in the hole group 83 of the cover plate 18 radially outwardly and directing a second plurality of holes 92 radially inwardly. Thus, air flowing through the radially inwardly directed holes 92 is complementary to the helical toroidal flow pattern 70 produced by the apertures 60 in the cover plate 18. Moreover, air flow through the radially outwardly directed apertures 90 in the cover plate 18 and is complementary to the radially outward flow produced by the convergence of the oppositely directed helical toroidal flows 70 and 82 immediately above the fuel slinger 30 flowing radially outwardly centrally of the combustor 10. In other words, the groups of holes 59, 78 and 83 produce complementary flow patterns that produce desirable fuel/air flow patterns internally of the combustor 10 that maximize combustion efficiency, materially improve starting dependability, and concomitantly effect effusion cooling of the cover and primary plates 18 and 20, respectively.

In summary, it should be apparent from the foregoing description, that the unique effusion cooling hole geometry of the instant invention solves a heretofore unaddressed problem related to slinger fuel injected, radial outflow turbine engines. Some of the effusion cooling holes on opposite sides of the fuel slinger are oriented to direct cooling film air flow toward the fuel slinger resulting in the formation of smooth, uninterrupted cooling flows on opposite sides thereof that join one another and are subsequently absorbed by the radially directed fuel flow and secondary purge air flow. This configuration eliminates air-guides heretofore required to guide the flow of cooling air away from the combustor I.D. and from the fuel slinger. Angular orientation of the holes with respect to the axial centerline of the engine effects the aforesaid aerodynamic interaction between air flow and the radial fuel flow.

Optimal cooling of the combustor walls is accomplished by orienting a portion of the cooling flow along both axially spaced walls of the combustor in the direction of bulk gas flow radially outwardly toward the combustor exit. A transition area in one wall of the combustor changes film cooling flow orientation from radially outward to radially inward toward the fuel slinger. This transition area in the combustor wall is in the form of a criss-cross interweaving pattern that maintains sufficient cooling to protect the area from hot combustion gases.

An opposite combustor wall utilizes fanning of the effusion cooling holes to change the direction of cooling film flow. The fanned cooling holes provide a smooth transition in cooling flow direction without crossing hole paths. Fanning is accomplished by incrementally changing the orientation of the cooling holes, row by row, from one direction to another thereby providing an effective pattern in highly curved wall areas where other patterns provide less effective cooling and/or more complexity.

Concentration of the effusion cooling holes in the vicinity of larger air jet holes provides added local cooling and offsets bulk flow/jet wake wall heating. Near-jet wall cooling is important since the larger jets tend to locally pump hot gas mixture around their bases, as well as create local wakes due to a bulk flow effect. A concentration of cooling holes between and in the near vicinity of the large jets provides the additional cooling margin required to alleviate such bulk flow effects. The use of larger and/or more concentrated and directed effusion cooling holes provide additional downstream film cooling protection for other features, such as attachment joints or nozzle wall cooling. By taking advantage of hole angle and wall thickness, the disclosed extension of effusion cooling technology provides a protective cooling film downstream of the combustor.

The herein disclosed effusion cooling hole groupings and orientations exert significant control of local combustor aerodynamics. Typical gas turbine combustors control bulk flow aerodynamics, e.g. fuel/air stoichiometry, mixing and temperature distribution, by a combination of injection swirl generators and large impinging air jets. However, the strong radial flow of injected fuel and secondary purge air tends to locally pump or recirculate hot combustion gases around the base or I.D. of the combustor. The use of effusion cooling in this area, as taught herein, purges the combustor I.D. area of recirculated hot gases, by providing smooth flow termination just short of the slinger while providing improved local wall cooling. Moreover, since primary zone recirculation is driven in part by the injected fuel stream, orientation of the cooling film in the direction of primary bulk flow helps control and strengthen primary recirculation, providing a richer and more stable mixture to the igniter at start conditions.

While the preferred embodiment of the invention has been disclosed, it should be appreciated that the invention is susceptible of modification without departing from the scope of the following claims.

I claim:

1. In a gas turbine engine comprising a compressor rotatable about a central axis of the engine, a turbine rotatable about said axis and axially spaced from said compressor, a fuel slinger rotatable about said axis and interposed between said compressor and turbine, and an annular combustor radially aligned with and spaced radially outwardly from said fuel slinger for mixing air from said compressor with fuel from said fuel slinger and directing the products of combustion thereof radially outwardly to said turbine, an improved fuel distribution and effusion cooling system for said combustor comprising:

a radially extending combustor cover plate disposed axially forwardly of said fuel slinger having a first group of holes directed axially rearwardly and radially inwardly toward said fuel slinger as well as circumferentially in the direction of rotation of said fuel slinger, and a second group of holes spaced radially outwardly from said first group, a portion of said second group of holes being directed radially inwardly toward said fuel slinger, and a portion of said second group of holes being directed radially outwardly away from said fuel slinger; and a radially extending primary combustor plate disposed rearwardly of said fuel slinger, having a third group of holes directed circumferentially of said combustor in the direction of rotation of said fuel slinger, a first portion of said third group of holes adjacent said fuel injector extending radially inwardly toward said fuel slinger, a second portion of said third group of holes extending solely circumferentially, and a third portion of said third group of holes extending radially outwardly so as to produce a fan-shaped air flow pattern whereby flow through said first group of holes combines with flow through the first portion of said third group of holes to produce a pair of coaxial axially spaced helical toroidal flow patterns in the direction of rotation of said fuel slinger and on opposite sides axially thereof so as to augment radial flow and dispersion of fuel therefrom.

2. In the gas turbine of claim 1, a fuel igniter having an ignition end substantially radially aligned with a confluence of the helical flow patterns developed by air flow through said first and third hole groups and with fuel flow from said fuel slinger.

3. The gas turbine engine of claim 1 wherein said first group of circumferentially directed holes extend at an angle of approximately 45° to the central axis of said engine.

4. In a gas turbine engine comprising a compressor rotatable about a central axis of the engine, a turbine rotatable about said axis and axially spaced from said compressor, a fuel slinger rotatable about said axis and interposed between said compressor and turbine, and an annular combustor radially aligned with and spaced radially outwardly from said fuel slinger for mixing air from said compressor with fuel from said fuel slinger and directing the products of combustion thereof radially outwardly to said turbine, an improved fuel distribution and effusion cooling system for said combustor comprising:

a radially extending combustor cover plate disposed axially forwardly of said fuel slinger having a plurality of holes directed axially rearwardly toward said fuel slinger and circumferentially in the direction of rotation of said fuel slinger;

a radially extending primary combustor plate disposed rearwardly of said fuel slinger having a plurality of holes directed axially forwardly toward said fuel slinger and circumferentially in the direction of rotation of said fuel slinger thereby to produce a pair of coaxial axially spaced helical toroidal flow patterns in the direction of rotation of said fuel slinger and on opposite sides axially thereof whereby a confluence of said flow patterns augments radial flow and dispersion of fuel from said fuel slinger; and a fuel igniter having an ignition end substantially radially aligned with said fuel slinger and with the confluence of the helical flow patterns developed by air flow through the holes in said combustor cover plate and said primary combustor plate.

* * * * *